United States Patent
Yatsu (10) Patent No.: US 9,142,956 B2
(45) Date of Patent: Sep. 22, 2015

(54) MULTILEVEL POWER CONVERTER

(71) Applicant: FUJI ELECTRIC CO., LTD., Kawasaki (JP)

(72) Inventor: Makoto Yatsu, Akiruno (JP)

(73) Assignee: FUJI ELECTRIC CO., LTD. (JP)

( * ) Notice: Subject to any disclaimer, the term of this patent is extended or adjusted under 35 U.S.C. 154(b) by 472 days.

(21) Appl. No.: 13/766,235

(22) Filed: Feb. 13, 2013

(65) Prior Publication Data

US 2013/0270917 A1    Oct. 17, 2013

(30) Foreign Application Priority Data

Apr. 13, 2012  (JP) ................................. 2012-091629

(51) Int. Cl.
  *H02M 7/48* (2007.01)
  *H02J 1/00* (2006.01)
  *H02M 7/493* (2007.01)
(52) U.S. Cl.
  CPC .................. H02J 1/00 (2013.01); H02M 7/493 (2013.01); *Y10T 307/685* (2015.04)
(58) Field of Classification Search
  CPC ....... H02M 7/483; H02M 2/487; H02M 1/36; G05F 3/08; Y10T 307/68
  USPC .......................................... 307/151; 323/311
  See application file for complete search history.

(56) References Cited

U.S. PATENT DOCUMENTS

| | | | |
|---|---|---|---|
| 6,151,227 A * | 11/2000 | Mizutani et al. ................ | 363/41 |
| 6,278,626 B1 * | 8/2001 | Teichmann ................... | 363/135 |
| 6,480,403 B1 * | 11/2002 | Bijlenga ......................... | 363/98 |
| 7,471,532 B1 * | 12/2008 | Salama et al. .................. | 363/98 |
| 2004/0246746 A1 * | 12/2004 | Norrga et al. ................... | 363/16 |
| 2008/0315859 A1 * | 12/2008 | Ponnaluri et al. ............. | 323/351 |
| 2012/0044728 A1 * | 2/2012 | Yatsu et al. .................... | 363/126 |
| 2013/0176014 A1 * | 7/2013 | Guan et al. .................... | 323/311 |

FOREIGN PATENT DOCUMENTS

EP    2251969 A1 * 11/2010
EP    2 306 629 A2    4/2011

(Continued)

OTHER PUBLICATIONS

Fang Zheng Peng et al. A Multilevel Voltage-Source Converter System with Balanced DC Voltages, IEEE-PESC 1995 Conference Record pp. 1144-1150. Prepared by the Oak Ridge National Laboratory, Oak Ridge, TN.

*Primary Examiner* — Rexford Barnie
*Assistant Examiner* — Michael Warmflash
(74) *Attorney, Agent, or Firm* — Rossi, Kimms & McDowell LLP (57) ABSTRACT

Aspects of the invention are directed to a multilevel power converter the includes a DC power supply assembly having a positive terminal, a negative terminal, and a zero terminal; a first semiconductor switch series circuit composed of first through sixth semiconductor switches connected in series between the positive terminal and the negative terminal. The converter can include a second semiconductor switch series circuit composed of a first bidirectional switch, seventh and eighth semiconductor switches, and a second bidirectional switch connected in series between the connection point of the first and second semiconductor switches and the connection point of the fifth and sixth semiconductor switches, a first capacitor connected in parallel with a series circuit of the third and fourth semiconductor switches and a second capacitor connected in parallel with the second semiconductor switch series circuit.

8 Claims, 7 Drawing Sheets

(56) References Cited

FOREIGN PATENT DOCUMENTS

| EP | 2306629 | A2 | * | 4/2011 |
|---|---|---|---|---|
| JP | 11-164567 | A | | 6/1999 |
| JP | 2009-525717 | A | | 7/2009 |
| JP | 2010-246189 | A | | 10/2010 |
| JP | 2011-072118 | A | | 4/2011 |

* cited by examiner

| MODE \ ELEMENT | Q1 | Q2 | Q3 | Q4 | Q5 | Q6 | Q7 | Q8 | QR1 QR3 | QR2 QR4 | OUTPUT | C1 | C2 |
|---|---|---|---|---|---|---|---|---|---|---|---|---|---|
| 1 | ON | ON | ON | OFF | OFF | OFF | OFF | ON | OFF | ON | +3E | -- -- | -- -- |
| 2 | ON | ON | OFF | ON | OFF | OFF | OFF | ON | OFF | ON | +2E | CHAR-GING | -- -- |
| 3 | ON | OFF | ON | OFF | ON | OFF | OFF | ON | OFF | ON | +2E | DISCHAR-GING | CHAR-GING |
| 4 | OFF | ON | ON | OFF | OFF | OFF | OFF | ON | ON | ON |  | -- -- | DISCHAR-GING |
| 5 | ON | OFF | OFF | ON | ON | OFF | OFF | ON | OFF | ON | +1E | -- -- | CHAR-GING |
| 6 | OFF | ON | OFF | ON | OFF | OFF | OFF | ON | ON | ON |  | CHAR-GING | DISCHAR-GING |
| 7 | OFF | OFF | ON | OFF | ON | OFF | OFF | ON | ON | ON |  | DISCHAR-GING | -- -- |
| 8 | OFF | OFF | OFF | ON | ON | OFF | OFF | ON | ON | ON | 0 | -- -- | -- -- |
| 9 | OFF | ON | ON | OFF | OFF | OFF | ON | OFF | ON | ON |  | -- -- | -- -- |
| 10 | OFF | ON | OFF | ON | OFF | OFF | ON | OFF | ON | ON | -1E | DISCHAR-GING | -- -- |
| 11 | OFF | OFF | ON | OFF | ON | OFF | ON | OFF | ON | ON |  | CHAR-GING | DISCHAR-GING |
| 12 | OFF | ON | ON | OFF | OFF | ON | ON | OFF | ON | OFF |  | -- -- | CHAR-GING |
| 13 | OFF | OFF | OFF | ON | ON | OFF | ON | OFF | ON | ON | -2E | -- -- | DISCHAR-GING |
| 14 | OFF | ON | OFF | ON | OFF | ON | ON | OFF | ON | OFF |  | DISCHAR-GING | CHAR-GING |
| 15 | OFF | OFF | ON | OFF | ON | ON | ON | OFF | ON | OFF |  | CHAR-GING | -- -- |
| 16 | OFF | OFF | OFF | ON | ON | ON | ON | OFF | ON | OFF | -3E | -- -- | -- -- |

| MODE \ ELEMENT | Q1a | Q1b | Q2 | Q3 | Q4 | Q5 | Q6a | Q6b | Q7 | Q8 | QR1 QR3 | QR2 QR4 | OUTPUT | C1 | C2 |
|---|---|---|---|---|---|---|---|---|---|---|---|---|---|---|---|
| 1 | ON | ON | ON | OFF | OFF | OFF | OFF | | ON | OFF | ON | | +3E | -- | -- |
| 2 | ON | ON | OFF | ON | OFF | OFF | OFF | | ON | OFF | ON | | | CHAR-GING | -- |
| 3 | ON | OFF | ON | OFF | ON | OFF | OFF | | ON | OFF | ON | | +2E | DISCHAR-GING | CHAR-GING |
| 4 | OFF | ON | ON | ON | OFF | OFF | OFF | | ON | ON | ON | | | -- | DISCHAR-GING |
| 5 | ON | OFF | OFF | ON | ON | OFF | OFF | | ON | OFF | ON | | | -- | CHAR-GING |
| 6 | OFF | ON | ON | OFF | ON | OFF | OFF | | ON | ON | ON | | +1E | CHAR-GING | DISCHAR-GING |
| 7 | OFF | ON | OFF | ON | OFF | ON | OFF | | ON | ON | ON | | | DISCHAR-GING | -- |
| 8 | OFF | ON | OFF | OFF | ON | ON | OFF | | ON | ON | ON | | 0 | -- | -- |
| 9 | OFF | | ON | ON | OFF | OFF | OFF | ON | ON | OFF | ON | ON | | -- | -- |
| 10 | OFF | | ON | OFF | ON | OFF | OFF | ON | ON | OFF | ON | ON | | DISCHAR-GING | -- |
| 11 | OFF | OFF | ON | OFF | ON | OFF | ON | | ON | OFF | ON | ON | -1E | CHAR-GING | DISCHAR-GING |
| 12 | OFF | ON | ON | OFF | OFF | ON | | | ON | OFF | ON | OFF | | -- | CHAR-GING |
| 13 | OFF | OFF | OFF | ON | ON | OFF | ON | | ON | OFF | ON | ON | | -- | DISCHAR-GING |
| 14 | OFF | ON | OFF | ON | OFF | ON | | | ON | OFF | ON | OFF | -2E | DISCHAR-GING | CHAR-GING |
| 15 | OFF | OFF | ON | OFF | ON | ON | | | ON | OFF | ON | OFF | | CHAR-GING | -- |
| 16 | OFF | OFF | OFF | ON | ON | ON | | | ON | OFF | ON | OFF | -3E | -- | -- |

FIG. 7

MULTILEVEL POWER CONVERTER

BACKGROUND OF THE INVENTION

1. Field of the Invention

Embodiments of the invention are related to semiconductor power converter technology, and in particular, to technology related to constructing multilevel power conversion circuits.

2. Description of the Related Art

Figure 7:
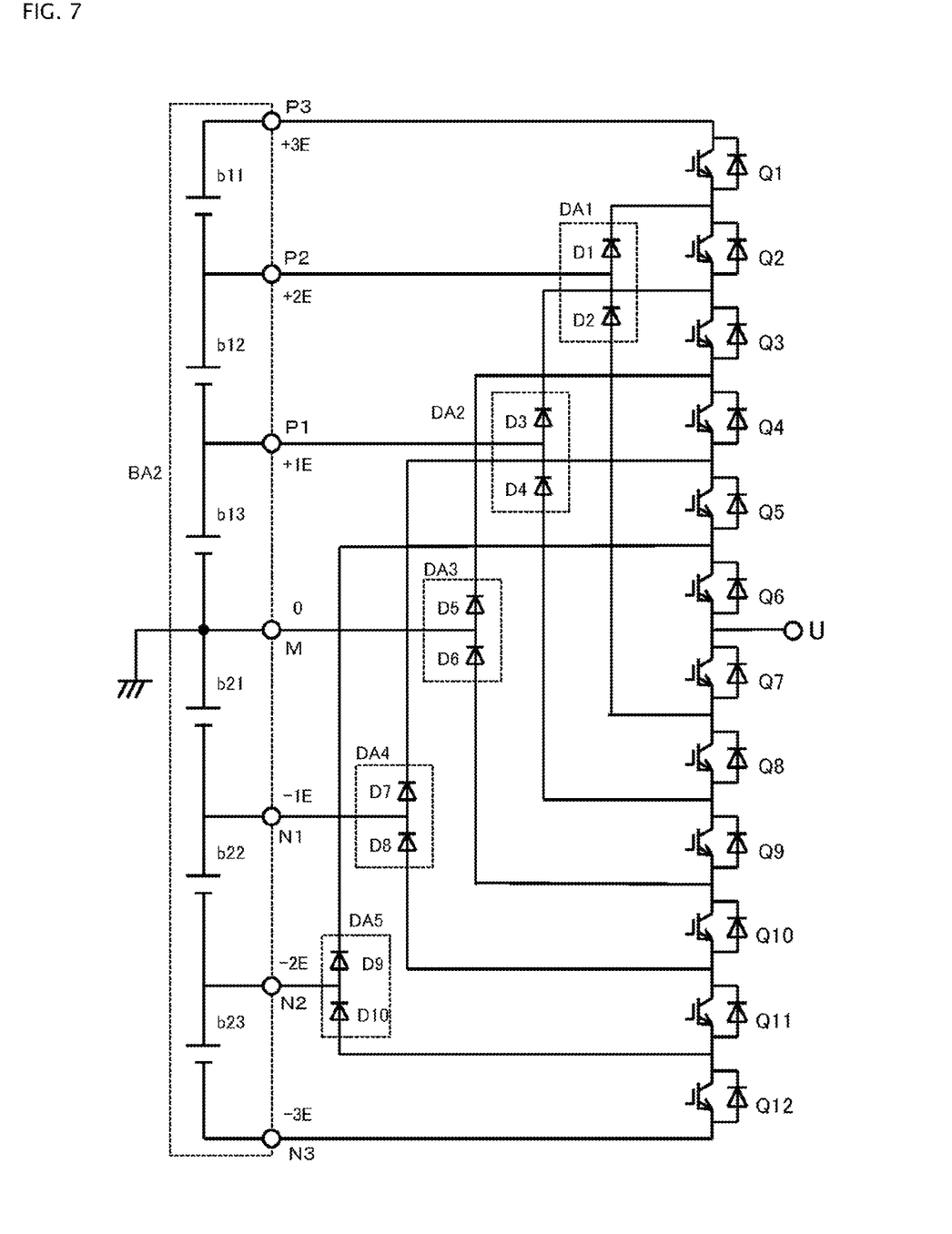
FIG. 7 is a circuit diagram showing a multilevel power converter of a conventional technology.

FIG. 7 shows an example of seven level power conversion circuit according to a conventional technology disclosed in Japanese Unexamined Patent Application Publication No. H11-164567. The circuit of FIG. 7 is a partial circuit for one phase of a multilevel, seven level in the conventional circuit of FIG. 7, power conversion circuit. A single phase conversion circuit can be composed by using two partial circuits of FIG. 7 and a three phase conversion circuit can be composed by using three partial circuits of FIG. 7. Referring to FIG. 7, a DC power supply assembly BA2 comprises series-connected single DC power supplies b11, b12, b13, b21, b22, and b23. The DC power supply assembly BA2 has seven terminals P1, P2, P3, M, N1, N2, and N3 at seven different voltage levels. A series connection circuit of semiconductor switches Q1 through Q12, which are IGBTs in this example, is connected between the positive terminal P3 and the negative terminal N3. The connection point of the semiconductors Q6 and Q7 is connected to an AC output terminal U. A diode arm pair DA1 composed of series-connected diodes D1 and D2 is connected between the connection point of the semiconductor switches Q1 and Q2 and the connection point of the semiconductor switches Q7 and Q8. The middle terminal of the diode arm pair DA1 is connected to the connection point of the single DC power supplies b11 and b12.

Similarly, a diode arm pair DA2 composed of series-connected diodes D3 and D4 is connected between the connection point of the semiconductor switches Q2 and Q3 and the connection point of the semiconductor switches Q8 and Q9. The middle terminal of the diode arm pair DA2 is connected to the connection point of the single DC power supplies b12 and b13.

A diode arm pair DA3 composed of series-connected diodes D5 and D6 is connected between the connection point of the semiconductor switches Q3 and Q4 and the connection point of the semiconductor switches Q9 and Q10. The middle terminal of the diode arm pair DA3 is connected to the connection point of the single DC power supplies b13 and b21.

The diode arm pair DA4 composed of series-connected diodes D7 and D8 is connected between the connection point of the semiconductor switches Q4 and Q5 and the connection point of the semiconductor switches Q10 and Q11. The middle terminal of the diode arm pair DA4 is connected to the connection point of the single DC power supplies b21 and b22.

A diode arm pair DA5 composed of series-connected diodes D9 and D10 is connected between the connection point of the semiconductor switches Q5 and Q6 and the connection point of the semiconductor switches Q11 and Q12. The middle terminal of the diode arm pair DA5 is connected to the connection point of the single DC power supplies b22 and b23.

In this circuit construction, when the semiconductor switches Q1 through Q6 are in the ON state and the semiconductor switches Q7 through Q12 are in the OFF state, the AC terminal U outputs a voltage +3E; when the semiconductor switches Q2 through Q7 are in the ON state and the semiconductor switches Q8 through Q12 and Q1 are in the OFF state, the AC terminal U outputs a voltage +2E; when the semiconductor switches Q3 through Q8 are in the ON state and the semiconductor switches Q9 through Q12 and Q1 and Q2 are in the OFF state, the AC terminal U outputs a voltage +1E; when the semiconductor switches Q4 through Q9 are in the ON state and the semiconductor switches Q10 through Q12 and Q1 through Q3 are in the OFF state, the AC terminal U outputs a voltage 0 (zero); when the semiconductor switches Q5 through Q10 are in the ON state and the semiconductor switches Q11 and Q12 and Q1 through Q4 are in the OFF state, the AC terminal U outputs a voltage −1E; when the semiconductor switches Q6 through Q11 are in the ON state and the semiconductor switches Q12 and Q1 through Q5 are in the OFF state, the AC terminal U outputs a voltage −2E; and when the semiconductor switches Q7 through Q12 are in the ON state and the semiconductor switches Q1 through Q6 are in the OFF state, the AC terminal U outputs a voltage −3E. Thus, the AC terminal U can deliver seven levels of output voltages by adjusting ON/OFF of the semiconductor switches Q1 through Q12.

In the conventional circuit of FIG. 7, six series-connected semiconductor switches at the maximum carry the output current from the DC power supply assembly BA2 to the AC terminal U. This causes large steady-state ON-state loss in the semiconductor switches and deterioration of the overall conversion efficiency of the conversion device. Down-sizing and cost reduction are also difficult. Additionally in the multilevel power conversion circuit as shown in FIG. 7, the single DC power supplies b11, b12, b13, b21, b22, and b23 do not bear an equal power in principle even though the output voltage and current from the AC terminal U have AC wave forms symmetrical with respect to electrical polarity. Thus, the single DC power supplies need to be independent on each other. The DC power supply assembly BA2, an input device of the multilevel power conversion circuit, needs six single DC power supplies each delivering a power independently, which imposes a severe limitation in production of the device. The problem of unbalance of DC power supplies is disclosed in IEEE-PESC 1995 Conference Record pp. 1144-1150 entitled "A multi-level voltage source converter system with balanced DC voltage." Thus, as described above, there exists certain shortcomings in the art of DC power supplies.

SUMMARY OF THE INVENTION

Embodiments of the invention address these and other shortcomings. Embodiments of the invention provide a multilevel power converter that generates reduced loss owing to reduced number of semiconductor switches carrying output current as compared with conventional devices and that can be operated with a DC power supply assembly composed of only two single DC power supplies.

Some embodiments provide for a multilevel power converter for converting DC power to AC power or AC power to DC power of a first aspect of the invention that includes: a DC power supply assembly having first and second single DC power supplies connected in series, and three terminals of a positive terminal, a negative terminal, and a middle point terminal at a middle electric potential between the positive terminal and the negative terminal; a first semiconductor series circuit composed of first through sixth semiconductor switches, each having an antiparallel-connected diode, connected in series in this order between the positive terminal and the negative terminal of the DC power supply assembly; a second semiconductor series circuit composed of a first bidirectional switch, seventh and eighth semiconductor switches each having an antiparallel-connected diode, and second bidirectional switch connected in series in this order between a connection point of the first semiconductor switch and the second semiconductor switch and the connection point of the fifth semiconductor switch and the sixth semiconductor switch; a first capacitor connected in parallel with a series circuit of the third semiconductor switch and the fourth semiconductor switch; and a second capacitor connected in parallel with the second semiconductor switch series circuit; wherein the zero terminal is connected to a connection point of the seventh semiconductor switch and the eighth semiconductor switch; and an AC terminal is at a connection point of the third semiconductor switch and the fourth semiconductor switch.

Some embodiments are directed to a second aspect of the invention, wherein the first semiconductor switch or the sixth semiconductor switch is composed of a plurality of semiconductor switches having the same function connected in series and the series-connected semiconductor switches are each driven with a different control signal.

Some embodiments are directed to a multilevel power converter of a third aspect of the invention, wherein the first bidirectional switch or the second bidirectional switch is composed of semiconductor elements having reverse blocking ability in antiparallel connection and the antiparallel-connected semiconductor elements are each driven with a different control signal.

Some embodiments are directed to a multilevel power converter device of a fourth aspect of the invention, wherein the first bidirectional switch or the second bidirectional switch is composed of semiconductor switches that are series-connected with each other in an anti-series mode and each of the semiconductor switches has an antiparallel connected diode and driven with a different control signal.

Some embodiments are directed to a fifth aspect of the present invention, wherein the multilevel power converter uses the DC power supply assembly having the three terminals at voltage levels of +3E, 0, and −3E, holds the first capacitor at a voltage of 1E and the second capacitor at a voltage of 2E, generates seven levels of voltages of +3E, +2E, +1E, 0, −1E, −2E, and −3E utilizing voltages of the DC power supply assembly, the first capacitor, and the second capacitor, and delivers any voltage selected from the seven levels of voltages to the AC terminal.

Embodiments of the invention reduce the number of semiconductor switches carrying the current from the input DC power supply assembly to the AC output terminal from six at the maximum to four at the maximum, thus decreasing power loss. This can, in some circumstances, result in higher efficiency, lower cost, and smaller size. In addition, in some embodiments, the input DC power supply assembly can be composed of only two single DC power supplies, which eliminates the limitation imposed on the conventional circuit, making equipment production easier.

DETAILED DESCRIPTION

A multilevel power converter of embodiments of the invention can include: a DC power supply assembly having a positive terminal, a zero terminal, and a negative terminal; a first semiconductor switch series circuit composed of first through sixth semiconductor switches connected in series in this order between the positive terminal and the negative terminal; a second semiconductor switch series circuit composed of a first bidirectional switch, seventh and eighth semiconductor switches, and a second bidirectional switch connected in series in this order between the connection point of the first and second semiconductor switches and the connection point of the fifth and sixth semiconductor switches; a first capacitor connected in parallel with a series circuit of the third and fourth semiconductor switches; and a second capacitor connected in parallel with the second semiconductor switch series circuit; wherein the zero terminal of the DC power supply assembly is connected to the connection point of the seventh and eighth semiconductor switches and an AC terminal is connected to the connection point of the third and fourth semiconductor switches.

Embodiment 1

Figure 1:
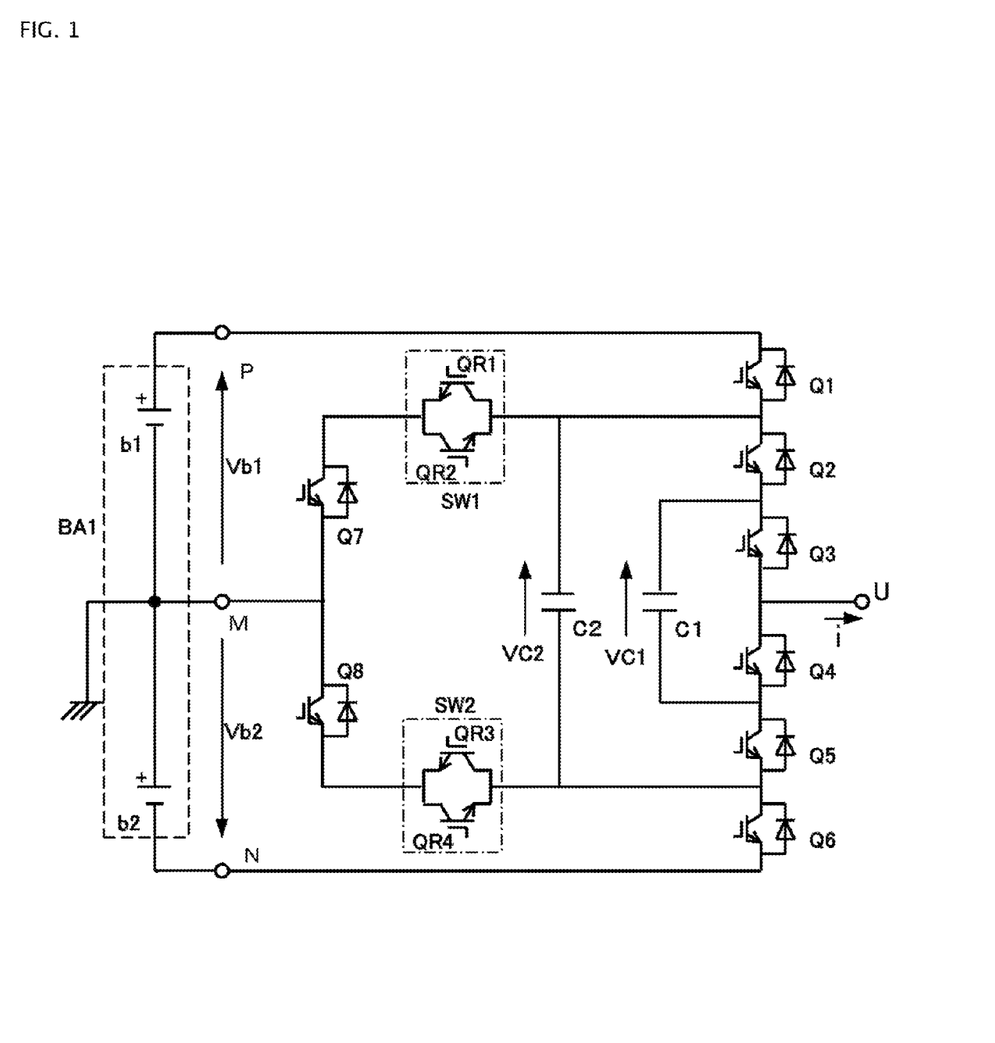
FIG. 1 is a circuit diagram showing a multilevel power converter according to a first embodiment of the invention.

FIG. 1 shows a first embodiment of the invention. The circuit of FIG. 1 is one phase of a power conversion circuit that uses a DC power supply circuit of the DC power supply assembly BA1 having three terminals of a positive terminal, a zero terminal, and a negative terminal and comprising series-connected single DC power supplies b1 and b2. This multilevel power conversion circuit comprises a first semiconductor switch series circuit composed of series-connected semiconductor switches Q1 through Q6 connected between the positive terminal P and the negative terminal N of the DC power supply assembly BA1, and a first capacitor C1 connected in parallel with a series circuit of semiconductor switches Q3 and Q4. A second capacitor C2 is connected between the connection point of semiconductor switches Q1 and Q2 and the connection point of semiconductor switches Q5 and Q6. A second semiconductor switch series circuit is connected in parallel with the second capacitor C2. The second semiconductor switch series circuit comprises a bidirectional switch SW1, the semiconductor switches Q7 and Q8, and another bidirectional switch SW2 connected in series. The connection point of the semiconductor switches Q7 and Q8 is connected to the zero terminal M of the DC power supply assembly BA1, and the connection point of the semiconductor switches Q3 and Q4 is connected to the AC terminal U.

The following describes the operation of the circuit having the construction described above with reference to FIGS. 2 and 3. The following description is made for the seven level power conversion circuit in which a voltage Vb1 of the single DC power supply b1 of 3E, a voltage Vb2 of the single DC power supply b2 of −3E, a voltage VC1 of the capacitor C1 of 1E and a voltage VC2 of the capacitor C2 of 2E.

Figure 2:
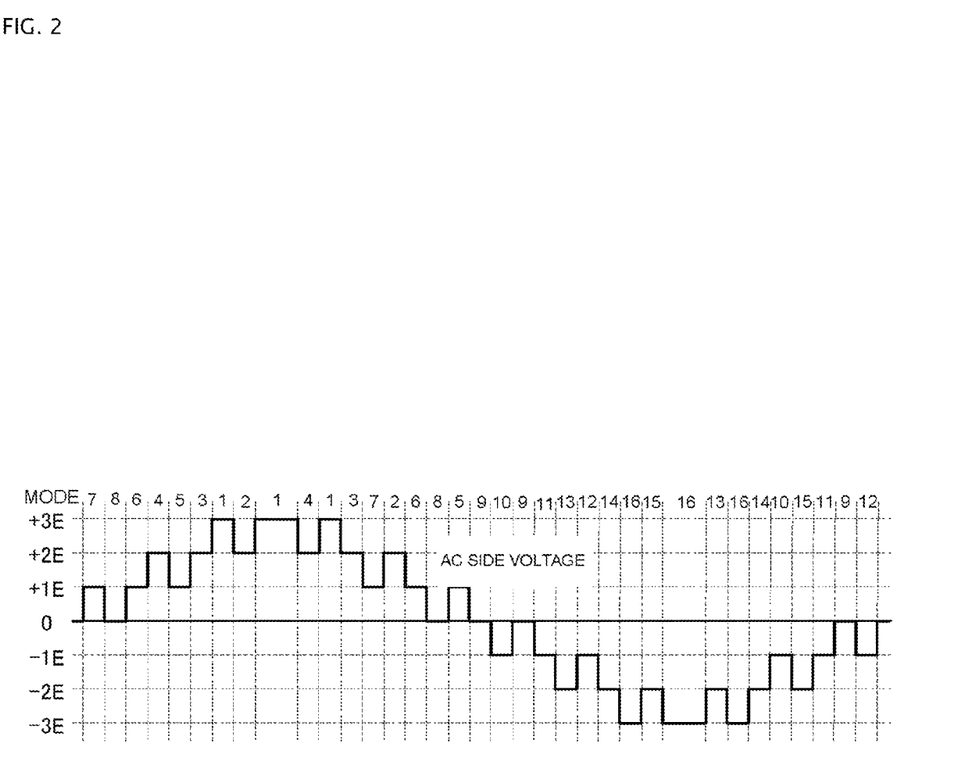
FIG. 2 shows operation modes and operation waveform of the multilevel power converter circuit according to the first embodiment of the invention.
Figure 3:
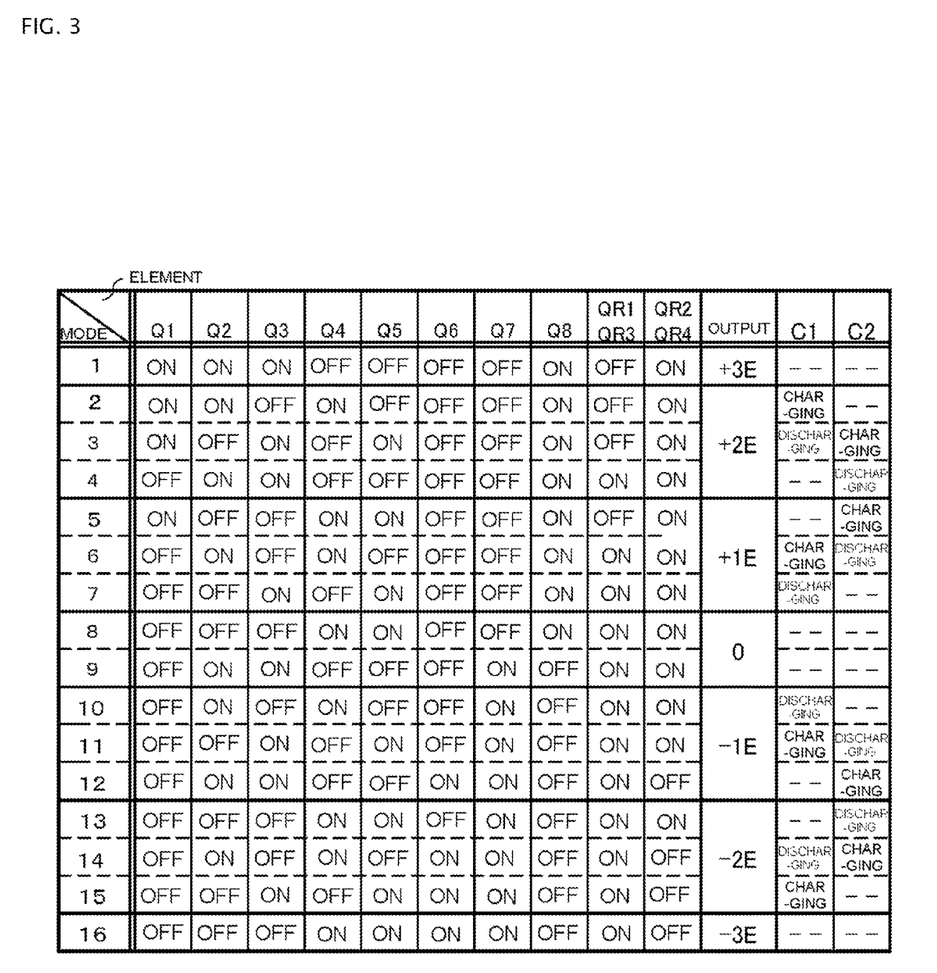
FIG. 3 shows the operation of semiconductor switches in the multilevel power converter circuit according to the first embodiment of the invention.

There are 16 switching modes as shown in FIG. 2 and FIG. 3.

The switching mode 1 delivers +3E at the AC terminal U. In the switching mode 1, the semiconductor switches Q1, Q2, and Q3 are in the ON state and the semiconductor switch Q4 and the QR1 of the bidirectional switch SW1 are in the OFF state. The output current flows through the path: the single DC power supply b1→the semiconductor switch Q1→the semiconductor switch Q2→the semiconductor switch Q3→the AC terminal U. The current passes through three semiconductor switches: Q1, Q2, and Q3. The voltage undergone by the semiconductor switch Q4 is equal to the voltage VC1 across the capacitor C1, 1E, in the condition of OFF states of the semiconductor switches Q5, Q6, and Q7 and the QR3 of the bidirectional switch SW2.

The semiconductor switch Q5 is subjected to a voltage VC2−VC1=1E that is the voltage VC2 of the capacitor C2 (2E) subtracted by the voltage VC1 of the capacitor C1 (1E). The semiconductor switch Q6 is subjected to a voltage equal to 4E that is the voltage−Vb2 of the single DC power supply b2+the voltage Vb1 of the single DC power supply b1−the voltage VC2 of the capacitor C2=4E. The bidirectional switch SW2 is subjected to a voltage equal to 1E that is the voltage Vb1 of the single DC power supply b1−the voltage VC2 of the capacitor C2=1E. The series-connected circuit of the semiconductor switch Q7 and the bidirectional switch SW1 is subjected to a voltage of 3E that is the voltage Vb1 of the single DC power supply b1. Here, if the semiconductor switch Q7 and the bidirectional switch SW1 of the series circuit thereof exhibit withstand voltages with a ratio of two to one, the semiconductor switch Q7 is subjected to a voltage of 2E and the bidirectional switch SW1 is subjected to a voltage of 1E.

In the seven level power conversion circuit as described above, the voltage at the AC terminal U is +3E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The bidirectional switches SW1 and SW2 and semiconductor switches Q4, Q5, Q6, and Q7 are subjected to the voltages 1E, 1E, 1E, 1E, 4E, and 2E, respectively.

The switching mode 2, with the assumption of seven level power conversion circuit as in the switching mode 1 described above, delivers +2E at the AC terminal U. In this switching mode 2, the semiconductor switches Q1, Q2, and Q4 are in the ON state and the semiconductor switches Q3, Q5, Q6, and Q7, and QR1 of the bidirectional switch SW1 and QR3 of the bidirectional switch SW2 are in the OFF state. The output current flows through the path: the single DC power supply b1→the semiconductor switch Q1→the semiconductor switch Q2→the capacitor C1→the semiconductor switch Q4→the AC terminal U. The current passes through three semiconductor switches Q1, Q2, and Q4. The AC terminal U delivers a voltage of 2E that is the voltage Vb1 of the single DC power supply b1 subtracted by the voltage VC1 of the capacitor C1. The semiconductor switch Q3 is subjected to a voltage of 1E that is the voltage VC1; the semiconductor switch Q5 is subjected to a voltage of 1E that is the voltage VC2 of the capacitor C2 subtracted by the voltage VC1 of the capacitor C1; the semiconductor switch Q6 is subjected to a voltage of 4E that is the voltage−Vb2 of the single DC power supply b2+the voltage Vb1 of the single DC power supply b1−the voltage VC2 of the capacitor C2; the bidirectional switch SW2 is subjected to a voltage of 1E that is the voltage Vb1 of the single DC power supply b1 subtracted by the voltage VC2 of the capacitor C2; and the series-connected circuit of the semiconductor switch Q7 and the bidirectional switch SW1 is subjected to the voltage Vb1 of the single DC power supply b1. These components are clamped at the voltages indicated above.

In the seven level power conversion circuit as described above, the voltage at the AC terminal U is +2E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The bidirectional switches SW1 and SW2 and the semiconductor switches Q3, Q5, Q6, and Q7 are subjected to the voltages 1E, 1E, 1E, 1E, 4E, and 2E, respectively.

The switching mode 3, with the assumption of seven level power conversion circuit as in the switching mode 1 described above, delivers +2E at the AC terminal U. In this switching mode 3, the semiconductor switches Q1, Q3, and Q5 are in the ON state and the semiconductor switches Q2, Q4, Q6, and Q7, and QR1 of the bidirectional switch SW1 and QR3 of the bidirectional switch SW2 are in the OFF state. The output current flows through the path: the single DC power supply b1→the semiconductor switch Q1→the capacitor C2→the semiconductor switch Q5→the capacitor C1→the semiconductor switch Q3→the AC terminal U. The current passes through three semiconductor switches Q1, Q5, and Q3. The AC terminal U delivers a voltage that is the voltage Vb1 of the single DC power supply b1−the voltage VC2 of the capacitor C2+the voltage VC1 of the capacitor C1.

In the seven level power conversion circuit as described above, the voltage at the AC terminal U is +2E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The bidirectional switches SW1 and SW2 and the semiconductor switches Q2, Q4, Q6, and Q7 are clamped at the voltages 1E, 1E, 1E, 1E, 4E, and 2E, respectively.

The switching mode 4, with the assumption of seven level power conversion circuit as in the switching mode 1 described above, delivers +2E at the AC terminal U. In this switching mode 4, the bidirectional switches SW1 and SW2 and the semiconductor switches Q2, Q3, and Q8 are in the ON state, and the semiconductor switches Q1, Q4, Q5, Q6, and Q7 are in the OFF state. The output current flows through the path: the zero terminal of the DC power supply assembly BA1→the semiconductor switch Q8→the bidirectional switch SW2→the capacitor C2→the semiconductor switch Q2→the semiconductor switch Q3→the AC terminal U. The current passes through four switches of the bidirectional switch SW2 and the semiconductor switches Q8, Q2, and Q3. The AC terminal U delivers directly a voltage of 2E that is the voltage VC2 of the capacitor C2.

In the seven level power conversion circuit as described above, the voltage at the AC terminal U is +2E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The semiconductor switches Q1, Q4, Q5, Q6, and Q7 are clamped at the voltages 1E, 1E, 1E, 3E, and 2E, respectively.

The switching mode 5, with the assumption of seven level power conversion circuit as described above, delivers +1E at the AC terminal U. In this switching mode 5, the semiconductor switches Q1, Q4, and Q5 are in the ON state, and the semiconductor switches Q2, Q3, Q6, and Q7 and the QR1 of the bidirectional switch SW1, and the QR3 of the bidirectional switch SW2 are in the OFF state. The output current flows through the path: the single DC power supply b1→the semiconductor switch Q1→the capacitor C2→the semiconductor switch Q5→the semiconductor switch Q4→the AC terminal U. The current passes through three switches of the semiconductor switches Q1, Q5, and Q4. The AC terminal U delivers a voltage of 1E that is the voltage Vb1 of the single DC power supply b1–the voltage VC2 of the capacitor C2.

In the seven level power conversion circuit as described above, the voltage at the AC terminal U is +1E under the conditions of: using the DC power supply assembly BA1 with the voltage Vb1 of the single DC power supply b1 of 3E and the voltage Vb2 of the single DC power supply b2 of –3E, and holding the voltage VC1 of the capacitor C1 at 1E and the voltage VC2 of the capacitor C2 at 2E. The bidirectional switches SW1 and SW2, the semiconductor switches Q2, Q3, Q6, and Q7 are clamped at the voltages 1E, 1E, 1E, 1E, 4E, and 2E, respectively.

The switching mode 6, with the assumption of seven level power conversion circuit as described above, delivers +1E at the AC terminal U. In this switching mode 6, the bidirectional switches SW1 and SW2, the semiconductor switches Q2, Q4, and Q8 are in the ON state, and the semiconductor switches Q1, Q3, Q5, Q6, and Q7 are in the OFF state. The output current flows through the path: the zero terminal M of the DC power supply assembly BA1→the semiconductor switch Q8→the bidirectional switch SW2→the capacitor C2→the semiconductor switch Q2→the capacitor C1→the semiconductor switch Q4→the AC terminal U. The current passes through four switches of the semiconductor switches Q8, Q2, and Q4 and the bidirectional switch SW2. The AC terminal U delivers a voltage of 1E that is the voltage VC2 of the capacitor C2–the voltage VC1 of the capacitor C1.

In the seven level power conversion circuit as described above, the voltage at the AC terminal U is +1E under the conditions of: using the DC power supply assembly BA1 with the voltage Vb1 of the single DC power supply b1 of 3E and the voltage Vb2 of the single DC power supply b2 of –3E, and holding the voltage VC1 of the capacitor C1 at 1E and the voltage VC2 of the capacitor C2 at 2E. The semiconductor switches Q1, Q3, Q5, Q6, and Q7 are clamped at the voltages 1E, 1E, 1E, 3E, and 2E, respectively.

The switching mode 7, with the assumption of seven level power conversion circuit as described above, delivers +1E at the AC terminal U. In this switching mode 7, the bidirectional switches SW1 and SW2, the semiconductor switches Q3, Q5, and Q8 are in the ON state, and the semiconductor switches Q1, Q2, Q4, Q6, and Q7 are in the OFF state. The output current flows through the path: the zero terminal M of the DC power supply assembly BA1→the semiconductor switch Q8→the bidirectional switch SW2→the semiconductor switch Q5→the capacitor C1→semiconductor switch Q3→the AC terminal U. The current passes through four switches of the semiconductor switches Q8, Q5, and Q3 and the bidirectional switch SW2. The AC terminal U delivers a voltage of 1Ed that is the voltage VC1 of the capacitor C1.

In the seven level power conversion circuit as described above, the voltage at the AC terminal U is +1E under the conditions of: using the DC power supply assembly BA1 with the voltage Vb1 of the single DC power supply b1 of 3E and the voltage Vb2 of the single DC power supply b2 of –3E, and holding the voltage VC1 of the capacitor C1 at 1E and the voltage VC2 of the capacitor C2 at 2E. The semiconductor switches Q1, Q2, Q4, Q6, and Q7 are clamped at the voltages 1E, 1E, 1E, 3E, and 2E, respectively.

The switching mode 8, with the assumption of seven level power conversion circuit as described above, delivers 0 (zero) at the AC terminal U. In this switching mode 8, the bidirectional switches SW1 and SW2, the semiconductor switches Q4, Q5, and Q8 are in the ON state, and the semiconductor switches Q1, Q2, Q3, Q6, and Q7 are in the OFF state. The output current flows through the path: the zero terminal M of the DC power supply assembly BA1→the semiconductor switch Q8→the bidirectional switch SW2→the semiconductor switch Q5→the semiconductor switch Q4→the AC terminal U. The current passes through four switches of the semiconductor switches Q8, Q5, and Q4 and the bidirectional switch SW2. The AC terminal U delivers a voltage of 0 (zero) that is the potential at the zero terminal M of the DC power supply assembly BA1.

In the seven level power conversion circuit as described above, the voltage at the AC terminal U is 0 (zero) under the conditions of: using the DC power supply assembly BA1 with the voltage Vb1 of the single DC power supply b1 of 3E and the voltage Vb2 of the single DC power supply b2 of –3E, and holding the voltage VC1 of the capacitor C1 at 1E and the voltage VC2 of the capacitor C2 at 2E. The semiconductor switches Q1, Q2, Q3, Q6, and Q7 are clamped at the voltages 1E, 1E, 1E, 3E, and 2E, respectively.

The switching mode 9, with the assumption of seven level power conversion circuit as described above, delivers 0 (zero) at the AC terminal U. In this switching mode 9, the bidirectional switches SW1 and SW2, the semiconductor switches Q2, Q3, and Q7 are in the ON state, and the semiconductor switches Q1, Q4, Q5, Q6, and Q8 are in the OFF state. The output current flows through the path: the zero terminal M of the DC power supply assembly BA1→the semiconductor switch Q7→the bidirectional switch SW1→the semiconductor switch Q2→the semiconductor switch Q3→the AC terminal U. The current passes through four switches of the semiconductor switches Q7, Q2, and Q3 and the bidirectional switch SW1. The AC terminal U delivers a voltage of 0 (zero) that is the potential at the zero terminal M of the DC power supply assembly BA1.

In the seven level power conversion circuit as described above, the voltage at the AC terminal U is 0 under the conditions of: using the DC power supply assembly BA1 with the voltage Vb1 of the single DC power supply b1 of 3E and the voltage Vb2 of the single DC power supply b2 of –3E, and holding the voltage VC1 of the capacitor C1 at 1E and the voltage VC2 of the capacitor C2 at 2E. The semiconductor switches Q1, Q4, Q5, Q6, and Q8 are clamped at the voltages 3E, 1E, 1E, 1E, and 2E, respectively.

The switching mode 10, with the assumption of seven level power conversion circuit as described above, delivers –1E at the AC terminal U. In this switching mode 10, the bidirectional switches SW1 and SW2, the semiconductor switches Q2, Q4, and Q7 are in the ON state, and the semiconductor switches Q1, Q3, Q5, Q6, and Q8 are in the OFF state. The output current flows through the path: the zero terminal M of the DC power supply assembly BA1→the semiconductor switch Q7→the bidirectional switch SW1→the semiconductor switch Q2→the capacitor C1→the semiconductor switch Q4→the AC terminal U. The current passes through four switches of the semiconductor switches Q7, Q2, and Q4 and the bidirectional switch SW1. The AC terminal U delivers a voltage of –1E that is the voltage–VC1 of the capacitor C1.

In the seven level power conversion circuit as described above, the voltage at the AC terminal U is –1E under the conditions of: using the DC power supply assembly BA1 with the voltage Vb1 of the single DC power supply b1 of 3E and the voltage Vb2 of the single DC power supply b2 of –3E, and holding the voltage VC1 of the capacitor C1 at 1E and the voltage VC2 of the capacitor C2 at 2E. The semiconductor switches Q1, Q3, Q5, Q6, and Q8 are clamped at the voltages 3E, 1E, 1E, 1E, and 2E, respectively.

The switching mode 11, with the assumption of seven level power conversion circuit as described above, delivers −1E at the AC terminal U. In this switching mode 11, the bidirectional switches SW1 and SW2, the semiconductor switches Q3, Q5, and Q7 are in the ON state, and the semiconductor switches Q1, Q2, Q4, Q6, and Q8 are in the OFF state. The output current flows through the path: the zero terminal M of the DC power supply assembly BA1→the semiconductor switch Q7→the bidirectional switch SW1→the capacitor C2→the semiconductor switch Q5→the capacitor C1→the semiconductor switch Q3→the AC terminal U. The current passes through four switches of the semiconductor switches Q7, Q5, and Q3 and the bidirectional switch SW1. The AC terminal U delivers a voltage of −1E that is the voltage−VC2 of the capacitor C2+the voltage VC1 of the capacitor C1.

In the seven level power conversion circuit as described above, the voltage at the AC terminal U is −1E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The semiconductor switches Q1, Q2, Q4, Q6, and Q8 are clamped at the voltages 3E, 1E, 1E, 1E, and 2E, respectively.

The switching mode 12, with the assumption of seven level power conversion circuit as described above, delivers −1E at the AC terminal U. In this switching mode 12, the semiconductor switches Q2, Q3, and Q6 are in the ON state, and the semiconductor switches Q1, Q4, Q5, and Q8, and the QR1 of the bidirectional switch SW1 and the QR3 of the bidirectional switch SW2 are in the OFF state. The output current flows through the path: the single DC power supply b2→the semiconductor switch Q6→the capacitor C2→the semiconductor switch Q2→the semiconductor switch Q3→the AC terminal U. The current passes through three switches of the semiconductor switches Q6, Q2, and Q3. The AC terminal U delivers a voltage of −1E that is the voltage Vb2 of the single DC power supply b2+VC2 of the capacitor C2.

In the seven level power conversion circuit as described above, the voltage at the AC terminal U is −1E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The bidirectional switches SW1 and SW2, semiconductor switches Q1, Q4, Q5, and Q8 are clamped at the voltages 1E, 1E, 4E, 1E, 1E, and 2E, respectively.

The switching mode 13, with the assumption of seven level power conversion circuit as described above, delivers −2E at the AC terminal U. In this switching mode 13, the bidirectional switches SW1 and SW2, and the semiconductor switches Q4, Q5, and Q7 are in the ON state, and the semiconductor switches Q1, Q2, Q3, Q6, and Q8, are in the OFF state. The output current flows through the path: the zero terminal M of the DC power supply assembly BA1→the semiconductor switch Q7→the bidirectional switch SW1→the capacitor C2→the semiconductor switch Q5→the semiconductor switch Q4→the AC terminal U. The current passes through four switches of the semiconductor switches Q7, Q5, and Q4 and the bidirectional switch SW1. The AC terminal U delivers a voltage of −2E that is the voltage−VC2 of the capacitor C2.

In the seven level power conversion circuit as described above, the voltage at the AC terminal U is −2E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The semiconductor switches Q1, Q2, Q3, Q6, and Q8 are clamped at the voltages 3E, 1E, 1E, 1E, and 2E, respectively.

The switching mode 14, with the assumption of seven level power conversion circuit as described above, delivers −2E at the AC terminal U. In this switching mode 14, the semiconductor switches Q2, Q4, and Q6 are in the ON state, and the semiconductor switches Q1, Q3, Q5, and Q8, and the QR2 of the bidirectional switch SW1 and the QR4 of the bidirectional switch SW2 are in the OFF state. The output current flows through the path: the single DC power supply b2→the semiconductor switch Q6→the capacitor C2→the semiconductor switch Q2→the capacitor C1→the semiconductor switch Q4→the AC terminal U. The current passes through three switches of the semiconductor switches Q6, Q2, and Q4. The AC terminal U delivers a voltage of −2E that is the voltage Vb2 of the single DC power supply b2+the voltage VC2 of the capacitor C2−the voltage VC1 of the capacitor C1.

In the seven level power conversion circuit as described above, the voltage at the AC terminal U is −2E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The bidirectional switches SW1 and SW2 and the semiconductor switches Q1, Q3, Q5, and Q8 are clamped at the voltages 1E, 1E, 4E, 1E, 1E, and 2E, respectively.

The switching mode 15, with the assumption of seven level power conversion circuit as described above, delivers −2E at the AC terminal U. In this switching mode 15, the semiconductor switches Q3, Q5, and Q6 are in the ON state, and the semiconductor switches Q1, Q2, Q4, and Q8, and the QR2 of the bidirectional switch SW1 and the QR4 of the bidirectional switch SW2 are in the OFF state. The output current flows through the path: the single DC power supply b2→the semiconductor switch Q6→the semiconductor switch Q5→the capacitor C1→the semiconductor switch Q3→the AC terminal U. The current passes through three switches of the semiconductor switches Q6, Q5, and Q3. The AC terminal U delivers a voltage of −2E that is the voltage Vb2 of the single DC power supply b2+the voltage VC1 of the capacitor C1.

In the seven level power conversion circuit as described above, the voltage at the AC terminal U is −2E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The bidirectional switches SW1 and SW2 and the semiconductor switches Q1, Q2, Q4, and Q8 are clamped at the voltages 1E, 1E, 4E, 1E, 1E, and 2E, respectively.

The switching mode 16, with the assumption of seven level power conversion circuit as described above, delivers −3E at the AC terminal U. In this switching mode 16, the semiconductor switches Q4, Q5, and Q6 are in the ON state, and the semiconductor switches Q1, Q2, Q3, and Q8, and the QR2 of the bidirectional switch SW1 and the QR4 of the bidirectional switch SW2 are in the OFF state. The output current flows through the path: the single DC power supply b2→the semiconductor switch Q6→the semiconductor switch Q5→the semiconductor switch Q4→the AC terminal U. The current passes through three switches of the semiconductor switches Q6, Q5, and Q4. The AC terminal U delivers a voltage of −3E that is the voltage Vb2 of the single DC power supply b2.

In the seven level power conversion circuit as described above, the voltage at the AC terminal U is −3E under the conditions of: using the DC power supply assembly BA1 with the voltage Vb1 of the single DC power supply b1 of 3E and the voltage Vb2 of the single DC power supply b2 of −3E, and holding the voltage VC1 of the capacitor C1 at 1E and the voltage VC2 of the capacitor C2 at 2E. The bidirectional switches SW1 and SW2 and the semiconductor switches Q1, Q2, Q3, and Q8 are clamped at the voltages 1E, 1E, 4E, 1E, 1E, and 2E, respectively.

The seven level power conversion circuit with the single DC power supplies b1 and b2 delivering voltages Vb1 of +3E and Vb2 of −3E, respectively, can output seven levels of voltages of +3E, +2E, +1E, 0, −1E, −2E, and −3E at the AC terminal U by the switching mode 1 through the switching mode 16.

The seven level power conversion circuit operates to deliver the same output voltage of +2E in the switching mode 2 through the switching mode 4. However, in the positive direction of the AC output current i from the AC terminal, the switching mode 2 charges the capacitor C1 with the AC output current i; the switching mode 3 discharges the capacitor C1 and charges the capacitor C2; and the switching mode 4 discharges the capacitor C2.

The same voltage of +1E is delivered from the AC terminal U in the switching mode 5 through switching mode 7. The switching mode 5 charges the capacitor C2; the switching mode 6 charges the capacitor C1 and discharges the capacitor C2; and the switching mode 7 discharges the capacitor C1. Thus, the voltage VC1 of the capacitor C1 and the voltage VC2 of the capacitor C2 can be adjusted independently by appropriately selecting, for delivering a voltage of +2E at the AC output terminal U, a switching mode from the switching modes 2, 3, and 4, and selecting, for delivering a voltage of +1E at the AC terminal U, a switching mode from the switching modes 5, 6, and 7. The example of seven level power conversion circuit described above controls the voltage VC1 of the capacitor C1 at 1E and the voltage VC2 of the capacitor C2 at 2E.

Because of the symmetry of the circuit, the similar relationship holds in the switching mode 10 through the switching mode 15. In the switching mode 1, switching mode 8, switching mode 9, and switching mode 16, no current flows through the capacitor C1 and the capacitor C2. Thus, the voltage VC1 of the capacitor C1 and the voltage VC2 of the capacitor C2 do not change.

Embodiment 2

Figure 4:
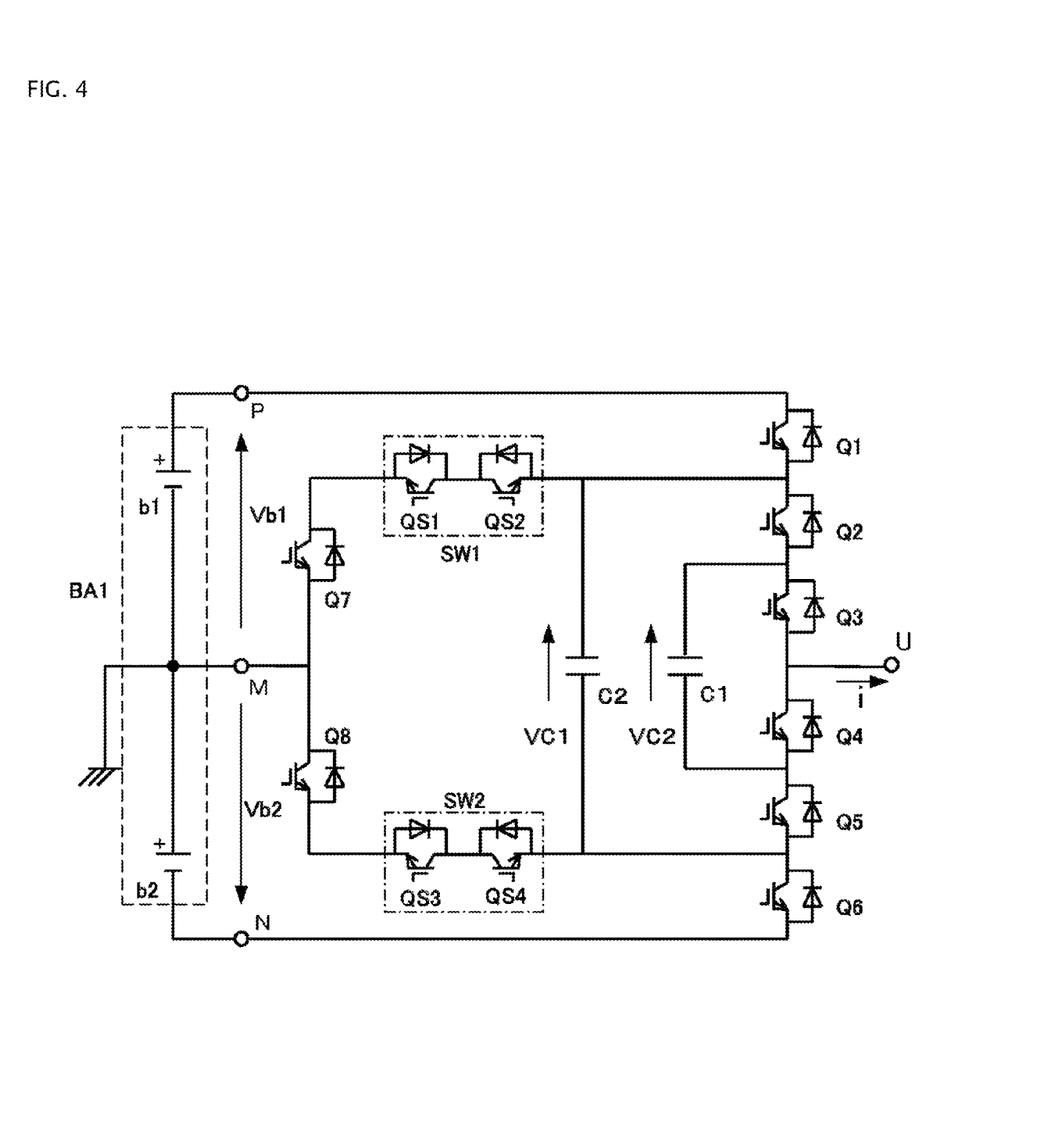
FIG. 4 is a circuit diagram showing a multilevel power converter according to a second embodiment of the invention.

FIG. 4 shows a multilevel power converter circuit according to a second embodiment of the invention. The device of this Embodiment 2 differs from the device of Embodiment 1 in the construction of bidirectional switches SW1 and SW2. While bidirectional switches in the circuit of the Embodiment 1 are constructed by antiparallel connection of reverse blocking semiconductor switches QR1 through QR4, bidirectional switches in Embodiment 2 are constructed by anti-series connection of semiconductor switches QS1 through QS4 without reverse blocking ability. In operation of the bidirectional switches of the Embodiment 2, the switching of the QS1 is conducted in the same ON/OFF operation as of the QR1; QS2, in the same ON/OFF operation as of the QR2; QS3, in the same ON/OFF operation as of the QR3; and QS4, in the same ON/OFF operation as of the QR4. Thus, the bidirectional switches SW1 and SW2 perform exactly the same operation and function in both Embodiment 1 and Embodiment 2.

Embodiment 3

Figure 5:
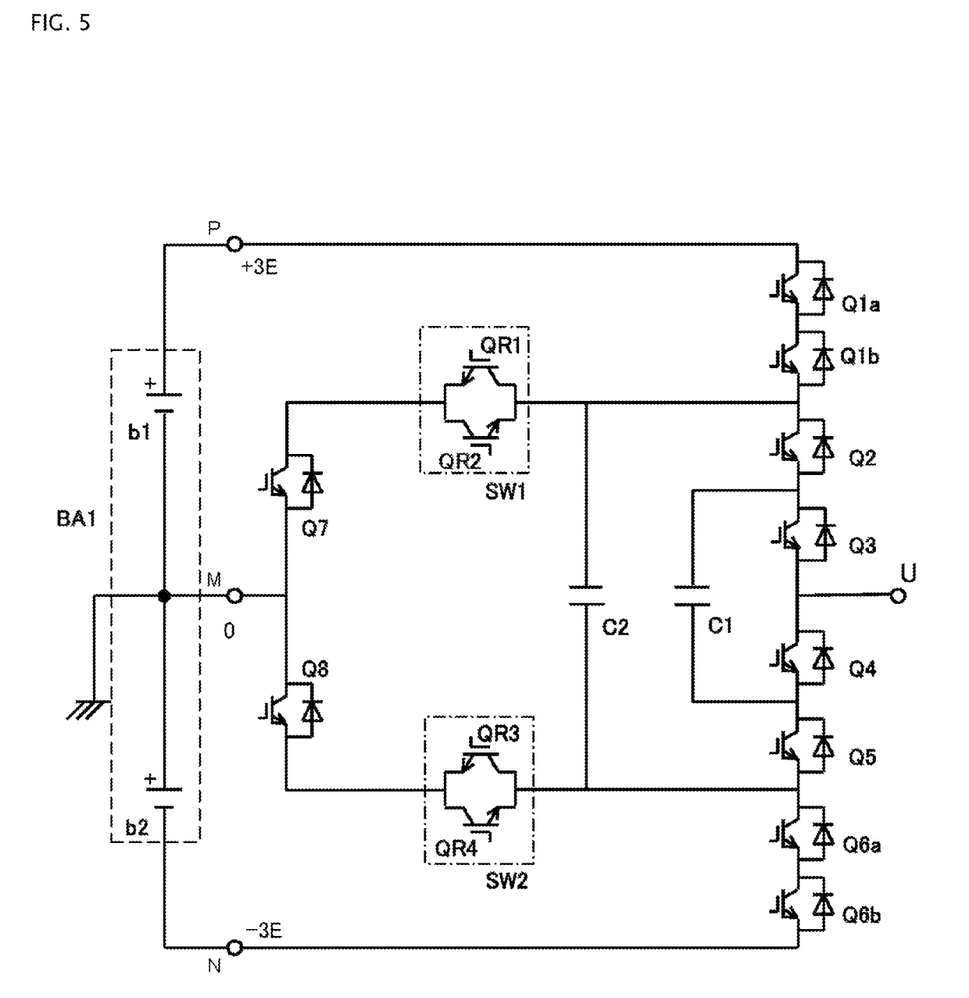
FIG. 5 is a circuit diagram showing a multilevel power converter according to a third embodiment of the invention.

FIG. 5 shows a multilevel power converter circuit of a third embodiment according to the invention. The device of this Embodiment 3 differs from the device of Embodiment 1 in that the semiconductor switch Q1 in Embodiment 1 is replaced by a series-connected circuit of semiconductor switches Q1a and Q1b in Embodiment 3 and the semiconductor switch Q6 in Embodiment 1 is replaced by a series-connected circuit of semiconductor switches Q6a and Q6b in Embodiment 3.

Figure 6:
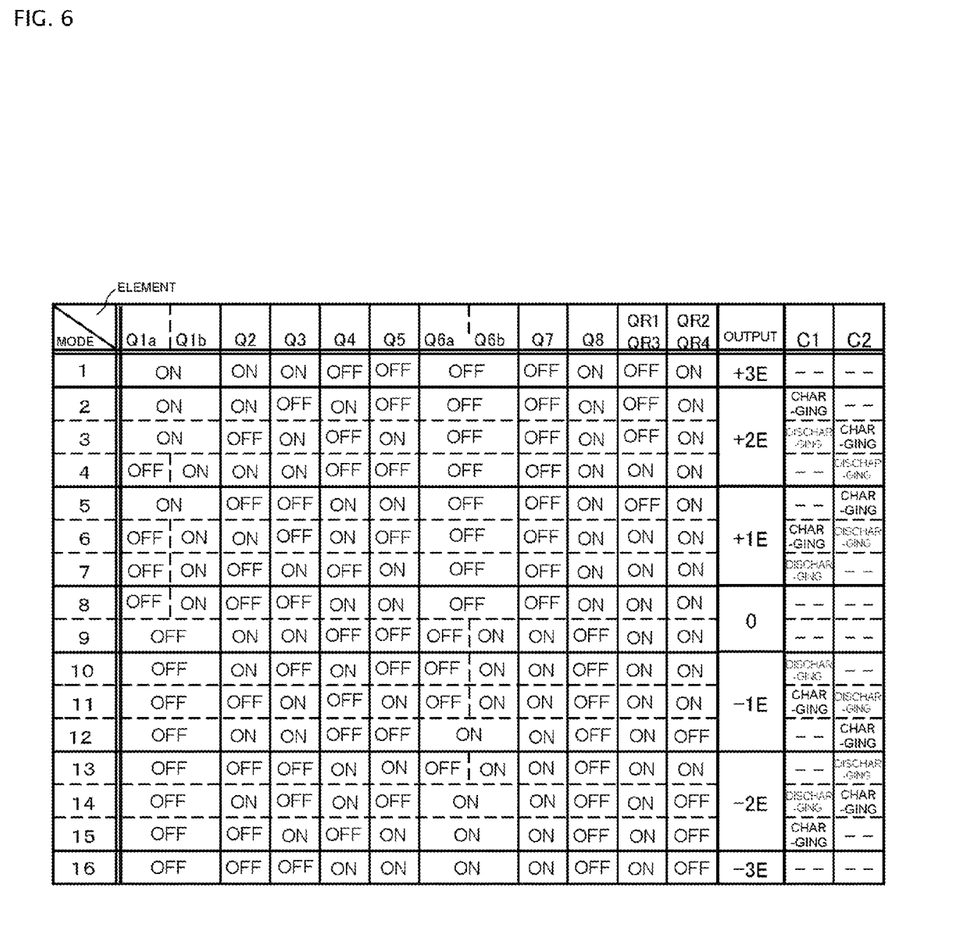
FIG. 6 shows the operation of semiconductor switches in the multilevel power converter circuit according to the third embodiment of the present invention.

FIG. 6 shows a seven level operation in the device with the replaced semiconductor switches Q1a, Q1b, Q6a, and Q6b. In the switching modes 1, 2, 3, and the switching mode 5, the switches Q1a and Q1b are both in the ON state and the switches Q6a and Q6b are both in the OFF state. In the switching mode 4 and the switching modes 6, 7, and 8, one of the switches Q1a and Q1b is in the ON state and both the Q6a and Q6b are in the OFF state. In the switching modes 9, 10, 11, and the switching mode 13, the Q1a and Q1b are both in the OFF state and one of the Q6a and Q6b is in the ON state. In the switching mode 12 and the switching modes 14, 15, and 16, the Q1a and Q1b are both in the OFF state and the Q6a and Q6b are both in the ON state.

In this operation shown in FIG. 6 of the device of FIG. 5, the semiconductor switches Q1 and Q6 in FIG. 1, each of which needs a withstand voltage of at least 4E in principle, can be replaced by the series-connected circuit of the semiconductor switches Q1a and Q1b and by the series-connected circuit of the semiconductor switches Q6a and Q6b, each of the Q1a, Q1b, Q6a, and Q6b being necessary to have only half the withstand voltage of the Q1 and Q6. Transition between the modes in this device is carried out by single switching operation of a semiconductor element of a low withstand voltage, which reduces switching loss and thus achieves lower loss in the device. In IGBTs of high withstand voltage of in the range of kilovolts or higher, for example, switching characteristics and steady-state loss deteriorate rapidly with increase in the withstand voltage. This technology of the invention is useful in such a case to reduce power loss employing semiconductor elements of low withstand voltage, which exhibit excellent characteristics The devices of the embodiments described thus far are inverters for converting a DC power to an AC power. However, the present invention can be applied to a converter circuit for converting an AC power to a DC power.

The present invention provides a circuit technology for generating a multilevel AC voltage from a small number of single DC power supplies, and can be applied to high voltage motor driving equipments and power converters for grid-connection.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-091629, filed on Apr. 13, 2012, contents of which are incorporated herein by reference.

What is claimed is:

1. A multilevel power converter comprising:
a DC power supply assembly having first and second single DC power supplies connected in series, and three terminals of a positive terminal, a zero terminal, and a negative terminal;
a first semiconductor switch series circuit composed of first through sixth semiconductor switches, each having an antiparallel-connected diode, connected in series in this order between the positive terminal and the negative terminal of the DC power supply assembly;
a second semiconductor switch series circuit composed of a first bidirectional switch, seventh and eighth semiconductor switches each having an antiparallel-connected diode, and second bidirectional switch connected in series in this order between a connection point of the first semiconductor switch and the second semiconductor switch and the connection point of the fifth semiconductor switch and the sixth semiconductor switch;
a first capacitor connected in parallel with a series circuit of the third semiconductor switch and the fourth semiconductor switch; and
a second capacitor connected in parallel with the second semiconductor switch series circuit;
wherein
the zero terminal of the DC power supply assembly is connected to a connection point of the seventh semiconductor switch and the eighth semiconductor switch; and
an AC terminal is at a connection point of the third semiconductor switch and the fourth semiconductor switch.

2. The multilevel power converter according to claim 1, wherein the first semiconductor switch or the sixth semiconductor switch is composed of a plurality of semiconductor switches having the same function connected in series and the series-connected semiconductor switches are each driven with a different control signal.

3. The multilevel power converter according to claim 1, wherein the first bidirectional switch or the second bidirectional switch is composed of semiconductor elements having reverse blocking ability in antiparallel connection and the antiparallel-connected semiconductor elements are each driven with a different control signal.

4. The multilevel power converter according to claim 2, wherein the first bidirectional switch or the second bidirectional switch is composed of semiconductor elements having reverse blocking ability in antiparallel connection and the antiparallel-connected semiconductor elements are each driven with a different control signal.

5. The multilevel power converter according to claim 1, wherein the first bidirectional switch or the second bidirectional switch is composed of semiconductor switches that are series-connected with each other in an anti-series mode and each of the semiconductor switches has an antiparallel connected diode and is driven with a different control signal.

6. The multilevel power converter according to claim 2, wherein the first bidirectional switch or the second bidirectional switch is composed of semiconductor switches that are series-connected with each other in an anti-series mode and each of the semiconductor switches has an antiparallel connected diode and is driven with a different control signal.

7. The multilevel power converter according to claim 1, wherein the multilevel power converter uses the DC power supply assembly having the three terminals at voltage levels of +3E, 0, and −3E, holds the first capacitor at a voltage of 1E and the second capacitor at a voltage of 2E, generates seven levels of voltages of +3E, +2E, +1E, 0, −1E, −2E, and −3E utilizing voltages of the DC power supply assembly, the first capacitor, and the second capacitor, and delivers any voltage selected from the seven levels of voltages to the AC terminal.

8. The multilevel power converter according to claim 2, wherein the multilevel power converter uses the DC power supply assembly having the three terminals at voltage levels of +3E, 0, and −3E, holds the first capacitor at a voltage of 1E and the second capacitor at a voltage of 2E, generates seven levels of voltages of +3E, +2E, +1E, 0, −1E, −2E, and −3E utilizing voltages of the DC power supply assembly, the first capacitor, and the second capacitor, and delivers any voltage selected from the seven levels of voltages to the AC terminal.

* * * * *